May 5, 1970     M. P. BENNETT     3,509,608
TAB WELDED JOINT AND METHOD OF MAKING
Filed Feb. 17, 1967
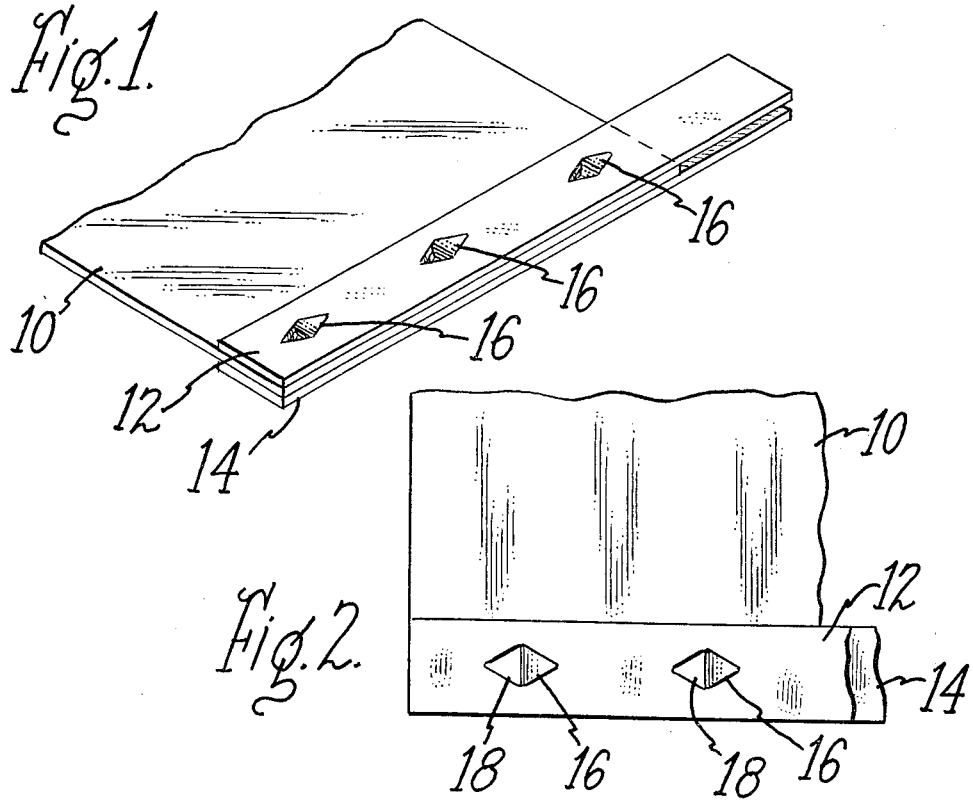
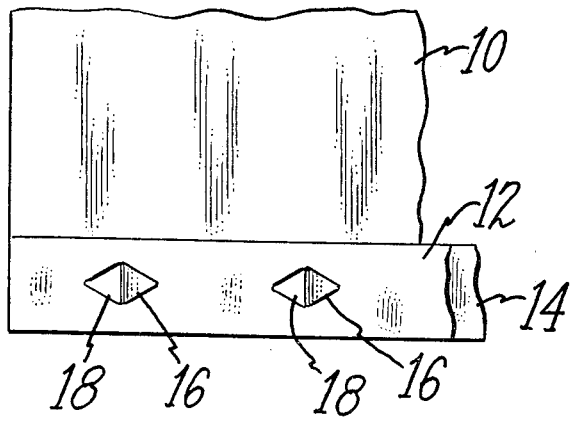
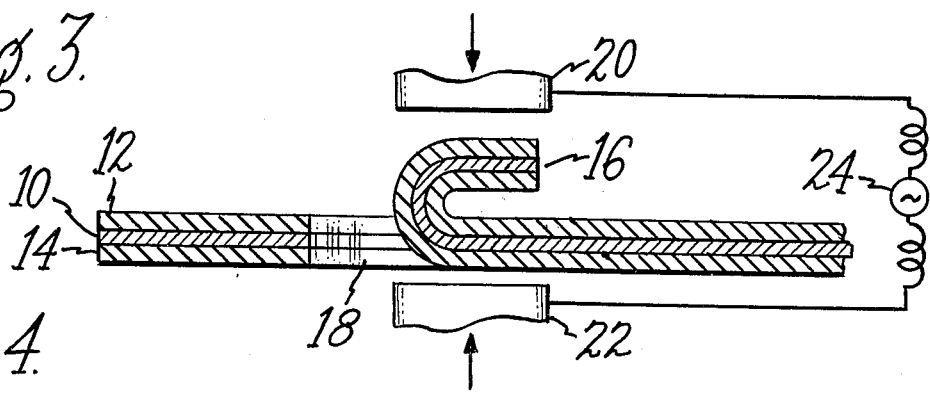
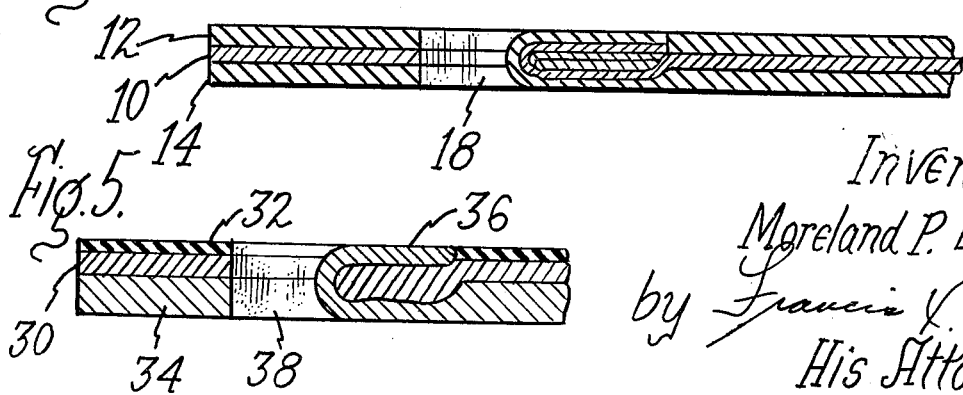
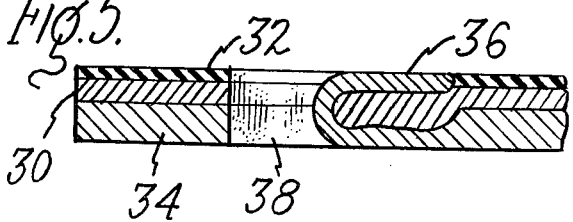
Inventor,
Moreland P. Bennett,
by Francis V. Doyle
His Attorney.

United States Patent Office 3,509,608
Patented May 5, 1970

3,509,608
TAB WELDED JOINT AND METHOD OF MAKING
Moreland P. Bennett, Pittsfield, Mass., assignor to General Electric Company, a corporation of New York
Filed Feb. 17, 1967, Ser. No. 616,945
Int. Cl. B23k 1/20
U.S. Cl. 29—482
5 Claims

ABSTRACT OF THE DISCLOSURE

A welded joint comprising overlapped strips of metal with tabs formed by piercing or lancing through the overlapped portion. The formed tabs are flattened against the metal and resistance spot welded to such metal. The resistance welding forms a metallurgical bond between the metal members.

Background of the invention

This invention relates to metal joints and more particularly to a welded joint and the method of making such joint. The joints of this invention find special utility in the electrical industry.

As is well known to those skilled in the metal joining art, it is often necessary to join metal members to provide not only a secure mechanical joint, but one which will provide a sound electrical connection. These types of joints are usually required in the electrical industry for securing electrical conductive members to each other. One well known connection which must be both mechanically secure and electrically sound is the connection made between the lead or tap strap and an electrical coil. In many modern day coils a very thin foil is used for the coil winding with somewhat thicker strip material used for leads or tap straps. In many coils, the winding is made of one metallic material such as aluminum while the leads or tap straps are made of another metallic material such as copper. Much difficulty has been experienced in providing adequate mechanical and electrical connections between the foil wound coils and the leads or tap straps.

Mechanical connections are usually formed by riveting or crimping and are generally undesirable because they depend solely on the contact between adjacent surfaces for transmission of electrical current. As these joints age, the connections tend to relax and oxides may form on the adjacent surfaces, providing very poor electrical connections. Solder connections are not useful for high current uses since the solder has a very low melting temperature. Further, there is no metallurgical bond between the solder and the joint surfaces, which often leads to a poor electrical connection. Brazing and welding of joints require an expensive cleaning process and also are very difficult to make without damage to the thin foils. It has recently been discovered that thin foils and strips of similar and dissimilar metals may be joined in a strong mechanical and electrical connection by piercing tabs in the metal and spot welding the formed tabs.

Summary of invention

It is therefore one object of this invention to provide a welded joint for joining thin foil and strips of metal.

A further object of this invention is to provide a method of making a mechanical weld joint between thin metal members.

A still further object of this invention is to provide a mechanical weld joint for metal members.

In carrying out this invention in one form, metal members to be joined are placed in overlapping relation. Tabs are formed through the overlapped portions of the metal members, the formed tabs are flattened and then spot welded to one of the metal members. The spot welding forms a metallurgical bond between the tab and the various metal members.

The invention sought to be protected will be particularly pointed out and distinctly claimed in the claims appended hereto. However, it is believed that this invention and the manner in which its various objects and advantages are obtained as well as other objects and advantages thereof, may be better understood from the following detailed description of a preferred embodiment especially when considered in conjunction with the accompanying drawing.

Brief description of drawing

FIGURE 1 is a perspective view of a preferred joint made according to this invention;

FIGURE 2 is a top view of the joint shown in FIGURE 1;

FIGURE 3 is an enlarged sectional view of metal members to be joined showing the preferred method of this invention;

FIGURE 4 is an enlarged sectional view of a completed joint made according to this invention; and FIGURE 5 is an enlarged sectional view of a completed joint made according to another embodiment of this invention.

Description of preferred embodiment

As above noted, it has been discovered that thin foils and strips of metal may be joined by using tabs formed in overlapped portions of the metal members and then spot welding the tabs to one of the metal members. The metals to be joined are placed in overlapped relation and a plurality of tabs are formed through the overlapped portions. A resistance spot welder is then applied to opposite sides of the joint flattening the tabs and welding them to the metal. The welding step metallurgically bonds the metals together providing a good electrical connection strengthened by the formed and welded tabs. In a preferred form of joint, a pair of relatively thicker strips are placed on each side of a foil member providing a joint which is mechanically stronger than can be obtained by a single strip and foil member.

Where copper and aluminum are to be joined by the method of this invention, it is found desirable to first tin-plate the copper and then to provide copper on each side of the aluminum. Of course, the copper could be silver-plated, if desired. However, from a cost view, tin-plating is preferred. This will provide a better metallurgical bond between the copper and the aluminum. Referring now to the drawings, in which like numerals are used to indicate like parts throughout the various views, FIGURE 1 shows a perspective view of a preferred joint made according to this invention. As shown in FIGURE 1, a joint is formed between a metal foil member 10 and a pair of thin metal strips 12 and 14. The metal strips 12 and 14 are placed on opposite sides of the foil 10. The three metal members have overlapped portions as shown. As can be seen, a plurality of tabs 16 are formed through the overlapped portions of the metal membetrs 10, 12 and 14. As is shown, particularly in FIGURE 2, the tabs 16 are preferrably of substantially triangular shape, leaving the triangular holes 18 through the overlapped metal portions. The tabs are flattened against the top metal strip 12 and welded thereto as will be more fully discussed with reference to FIGURE 3.

FIGURE 3 shows the preferred method of making the joint of this invention. FIGURE 3 is an enlarged sectional view showing a tab 16 pierced or lanced from the three overlapped portions of the foil 10 and the metal strips 12 and 14. As is apparent from FIGURE 3, tap 16 is formed from parts of each metal member and has been folded over the top of the strip 12. A resistance spot welder indicated by electrodes 20 and 22, is then brought in contact with opposite sides of the overlapped metal members 10, 12 and 14 at the tab 16 as indicated. The welder is energized by a source of electrical energy indicated at 24, such that when electrodes 20 and 22 contact the overlapped metal members, current will flow through the metal members to weld the members together. Sufficient pressure is applied by electrodes 20 and 22 as indicated by the arrows to flatten tab 16 against the metal strip 12. It is preferred to use refractory or other high resistance electrodes so that the electrodes provide the major heating for welding the joint.

A portion of a completed joint is shown in enlarged sectional view in FIGURE 4. As can be seen in FIGURE 4, the heat and pressure from the welding electrodes 20 and 22 has forced the tab 16 into the surface of the strip 12, welding the metal parts of tab 16 to each other and to the strip 12. The welding heat has also substantially welded the metal members 10, 12 and 14 to each other in the area of tab 16 as is shown by the drawing in FIGURE 4. Of course, it will be apparent that each tab in the joined surfaces will be similarly welded and that as many tabs as desired may be provided.

In a test of this invention, a pair of joints were made, each joint was formed of two strips of .010" thick copper, .75" wide with a 10" portion of .006" aluminum foil secured between the copper strips. The copper for both joints were tin plated. One joint was made with seven tabs, while the other joint was made with thirteen tabs. The joints were welded with the current of approximately 4,000 amperes and a pressure of approximately 75 pounds. Both joints were subjected to pull tests and to heat and short circuit tests. Both joints exhibited satisfactory strength, sustaining a tensile pull of approximately 90 pounds. The joints also passed 18 times normal current for 3.5 seconds. In the heat test the seven-tab joint ran approximately 5° C. hotter than the thirteen-tab joint. However, both joints were considered adequate for use in connecting lead wires to coils.

FIGURE 5 shows a completed joint made between a single strip of metal and a piece of foil, according to another embodiment of this invention. This form of the invention is especially useful when the foil member has been coated with insulation. As is shown in FIGURE 5, a foil member 30, provided with insulation 32 is joined to a metal strip 34. A tab 36 has been struck from the overlapped metals, leaving an opening 38. Tab 36 is then flattened against the insulation 32 on foil 30. Then a resistance spot welder such as is indicated in FIGURE 3, is applied to opposite sides of the metal members 30, 34 at tab 36. The heat and pressure provided by the resistance spot welder burns off the insulation 32 beneath tab 36 and welds foil 30 and strip 34 together, as shown. This method provides very good electrical joints between a lead and a foil winding without the necessity of removing the insulation prior to making the joint.

While there has been shown and decribed the present preferred embodiments of this invention, it will be clear that various changes may be made by those skilled in this art. For example, it will be apparent that sections of foil may be connected to each other by a metal strip by use of this inventioin. Other changes or uses may also be made by those skilled in this art without departing from the spirit and scope of the invention, particularly as defined in the appended claims.

What is claimed as new and which it is desired to be secured by Letters Patent of the United States is:

1. A method of making a strong electrical joint between thin metal members comprising the steps of:

(a) assembling the metal members to be joined in overlapping relation,
(b) forming tabs in said overlapped metal members,
(c) flattening said tabs and,
(d) applying welding heat and pressure to press said tabs into said metal members and weld said tabs thereto.

2. A method of making a strong electrical joint as set forth in claim 1 in which a thin metal member is placed between a pair of relatively thicker outer members.

3. A method of making a secure electrical joint as set forth in claim 1 in which the metal members are aluminum and copper and in which the aluminum member is placed between the copper members.

4. A method of making a strong electrical joint as set forth in claim 3 in which the copper is tin plated prior to assembly.

5. A method of making a strong electrical joint as set forth in claim 1 in which one metal member has an insulating coating thereon, said welding heat burning off said insulation and welding said members and said tabs together.

References Cited

UNITED STATES PATENTS

| | | | |
|---|---|---|---|
| 1,511,849 | 10/1924 | Taylor | 219—67 |
| 2,020,408 | 11/1935 | Fruth | 113—116 |
| 2,790,656 | 4/1957 | Cook | 29—492 |
| 2,795,832 | 6/1957 | Zinke | 29—457 XR |
| 3,252,203 | 5/1966 | Alberts et al. | 219—86 XR |
| 3,272,960 | 9/1966 | Smith | 219—91 |
| 3,277,268 | 10/1966 | Williams et al. | 219—92 |
| 3,407,280 | 10/1968 | Mitchell et al. | 219—105 |

JOHN F. CAMPBELL, Primary Examiner

R. B. LAZARUS, Assistant Examiner

U.S. Cl. X.R.

113—119; 29—628